(12) United States Patent
Yoshimura

(10) Patent No.: US 11,198,750 B2
(45) Date of Patent: Dec. 14, 2021

(54) METHOD FOR PRODUCING CARBOXYLATED NITRILE RUBBER

(71) Applicant: ZEON CORPORATION, Tokyo (JP)

(72) Inventor: Tsutomu Yoshimura, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 287 days.

(21) Appl. No.: 16/494,971

(22) PCT Filed: Mar. 16, 2018

(86) PCT No.: PCT/JP2018/010452
§ 371 (c)(1),
(2) Date: Sep. 17, 2019

(87) PCT Pub. No.: WO2018/180590
PCT Pub. Date: Oct. 4, 2018

(65) Prior Publication Data
US 2020/0283557 A1    Sep. 10, 2020

(30) Foreign Application Priority Data
Mar. 28, 2017  (JP) .............................. JP2017-062691

(51) Int. Cl.
*C08F 236/12*  (2006.01)
*C08F 220/44*  (2006.01)
*C08F 236/06*  (2006.01)
*C08F 220/06*  (2006.01)
*C08F 2/38*    (2006.01)
*C08F 6/22*    (2006.01)
*C08K 5/08*    (2006.01)

(52) U.S. Cl.
CPC .............. *C08F 236/12* (2013.01); *C08F 2/38* (2013.01); *C08F 6/22* (2013.01); *C08F 220/06* (2013.01); *C08F 220/44* (2013.01); *C08F 236/06* (2013.01); *C08K 5/08* (2013.01)

(58) Field of Classification Search
CPC .... C08F 236/12; C08F 220/44; C08F 236/06; C08F 2/38; C08F 6/22; C08F 220/06; C08K 5/08
See application file for complete search history.

(56) References Cited

U.S. PATENT DOCUMENTS

| 6,844,385 B1* | 1/2005 | Hagiwara ............. C08F 236/12 |
|---|---|---|
| | | 264/299 |
| 2015/0105515 A1* | 4/2015 | Brandau ................... C08C 1/14 |
| | | 524/565 |
| 2016/0108162 A1 | 4/2016 | Brandau et al. |
| 2017/0058100 A1* | 3/2017 | Nakashima ............ C08K 5/098 |
| 2017/0137607 A1 | 5/2017 | Brandau et al. |
| 2018/0251628 A1* | 9/2018 | Sugawara ................ C08K 5/11 |

FOREIGN PATENT DOCUMENTS

| CN | 105837753 A | 8/2016 |
|---|---|---|
| JP | 2009-203272 A | 9/2009 |
| JP | 2015-078367 A | 4/2015 |
| TW | 201540761 A | 11/2015 |
| TW | 201610576 A | 3/2016 |
| WO | 01/00726 A1 | 1/2001 |

OTHER PUBLICATIONS

Jun. 12, 2018 Search Report issued in International Patent Application No. PCT/JP2018/010452.
Feb. 8, 2021 Office Action issue in Indian Patent Application No. 201917037226.
Aug. 30, 2021 Hearing Notice issued in Indian Patent Application No. 201917037226.

* cited by examiner

Primary Examiner — Robert D Harlan
(74) Attorney, Agent, or Firm — Oliff PLC

(57) ABSTRACT

A method for producing a carboxyl group-containing nitrile rubber including the steps of: polymerizing a monomer mixture including an $\alpha,\beta$-ethylenically unsaturated nitrile monomer and a carboxyl group-containing monomer in a solvent; terminating a polymerization reaction by adding a nitrous acid salt and a water-insoluble hydroquinone as polymerization terminators to the polymerization system, thereby obtaining a dispersion of the carboxyl group-containing nitrile rubber having a pH of 7 or below; and coagulating the dispersion of the carboxyl group-containing nitrile rubber, thereby obtaining the carboxyl group-containing nitrile rubber in the solid state, wherein the amount of the nitrous acid salt to be used is 0.15 parts by weight or less relative to 100 parts by weight of the monomer mixture used in the polymerization reaction.

4 Claims, No Drawings

METHOD FOR PRODUCING CARBOXYLATED NITRILE RUBBER

TECHNICAL FIELD

The present invention relates to a method for producing a carboxyl group-containing nitrile rubber, and more particularly, to a method for producing a carboxyl group-containing nitrile rubber having excellent stability and having reduced discoloration.

BACKGROUND ART

Conventionally, nitrile rubber or acrylonitrile-butadiene copolymer rubber has been used as industrial belts, hoses, seals, packings, gaskets and the like, utilizing its oil resistance, mechanical properties, and chemical resistance.

Such a nitrile rubber is commonly produced as follows: Monomers including acrylonitrile are emulsion polymerized in a solvent such as water using a polymerization initiator. When a desired polymerization conversion ratio is achieved, a polymerization terminator is added to terminate the polymerization reaction, thereby obtaining a nitrile rubber dispersion. The obtained nitrile rubber dispersion is then coagulated (See Patent Document 1, for example).

RELATED ART DOCUMENTS

Patent Documents

Patent Document 1 Japanese Unexamined Patent Application Publication No. 2015-78367

SUMMARY OF THE INVENTION

Problem to be Solved by the Invention

On the one hand, a carboxyl group-containing nitrile rubber is known that is formed by introducing a carboxyl group to a nitrile rubber for the purpose of providing various properties such as excellent mechanical properties and high adhesiveness. Such a carboxyl group-containing nitrile rubber is used in applications such as adhesives utilizing its high adhesiveness, and is used as industrial belts, hoses, seals, packings, gaskets, and the like utilizing its excellent mechanical properties. On the other hand, although the discoloration of the carboxyl group-containing nitrile rubber should be prevented in some applications, according to the knowledge of the present inventors, the carboxyl group-containing nitrile rubber typically discolors due to a drying operation and the like, leading to difficulties in obtaining a carboxyl group-containing nitrile rubber having reduced discoloration.

Means for Solving the Problem

The present inventors, who have conducted extensive research to solve the problem above, have found that a polymerization terminator used in a polymerization reaction is responsible for the discoloration of a carboxyl group-containing nitrile rubber, and that by using a combination of specific polymerization terminators, it is possible to properly terminate the polymerization reaction and to effectively reduce the discoloration of the carboxyl group-containing nitrile rubber obtained through the polymerization. The findings have led to the completion of the present invention.

In other words, the present invention provides a method for producing a carboxyl group-containing nitrile rubber comprising the steps of: polymerizing a monomer mixture comprising an $\alpha,\beta$-ethylenically unsaturated nitrile monomer and a carboxyl group-containing monomer in a solvent; terminating a polymerization reaction by adding a nitrous acid salt and a water-insoluble hydroquinone as polymerization terminators to the polymerization system when a predetermined polymerization conversion ratio is achieved, thereby obtaining a dispersion of the carboxyl group-containing nitrile rubber having a pH of 7 or below; and coagulating the dispersion of the carboxyl group-containing nitrile rubber, thereby obtaining the carboxyl group-containing nitrile rubber in the solid state, wherein the amount of the nitrous acid salt to be used is 0.15 parts by weight or less relative to 100 parts by weight of the monomer mixture used in the polymerization reaction.

In the producing method of the present invention, the water-insoluble hydroquinone is preferably added in the form of a dispersion in which the water-insoluble hydroquinone is dispersed in water.

Further, in the production method according to the present invention, the amount of the water-insoluble hydroquinone to be used is preferably from 0.1 to 1.0 part by weight relative to 100 parts by weight of the monomer mixture used in the polymerization reaction.

In addition, in the production method according to the present invention, the weight ratio of the amount of the nitrous acid salt to be used to the amount of the water-insoluble hydroquinone to be used is preferably within the range from 1:0.5 to 1:100.

Effects of Invention

The production method according to the present invention can properly terminate the polymerization reaction, and thus can provide a carboxyl group-containing nitrile rubber whose discoloration is significantly reduced and which has excellent stability.

DESCRIPTION OF EMBODIMENTS

A method for producing a carboxyl group-containing nitrile rubber, comprising the steps of:

polymerizing a monomer mixture comprising an $\alpha,\beta$-ethylenically unsaturated nitrile monomer and a carboxyl group-containing monomer in a solvent (a polymerization step);

terminating a polymerization reaction by adding a nitrous acid salt and a water-insoluble hydroquinone as polymerization terminators to the polymerization system when a predetermined polymerization conversion ratio is achieved, thereby obtaining a dispersion of the carboxyl group-containing nitrile rubber having a pH of 7 or below (a polymerization termination step); and coagulating the dispersion of the carboxyl group-containing nitrile rubber, thereby obtaining the carboxyl group-containing nitrile rubber in the solid state (a coagulation step), wherein the amount of the nitrous acid salt to be used is 0.15 parts by weight or less relative to 100 parts by weight of the monomer mixture used in the polymerization reaction.

The steps described above, i.e. the polymerization step, the polymerization termination step, and the coagulation step will be described in turn below.

<Polymerization Step>

In the polymerization step in the production method according to the present invention, a monomer mixture comprising an α,β-ethylenically unsaturated nitrile monomer and a carboxyl group-containing monomer is polymerized in a solvent.

The monomer mixture used in the production method according to the present invention may be any mixture containing monomers according to a desired composition. The monomer mixture at least contains the α,β-ethylenically unsaturated nitrile monomer and the carboxyl group-containing monomer.

The α,β-ethylenically unsaturated nitrile monomer may be any α,β-ethylenically unsaturated compound having a nitrile group. Examples thereof include acrylonitrile; α-halogenoacrylonitriles such as α-chloroacrylonitrile and α-bromoacrylonitrile; α-alkylacrylonitriles such as methacrylonitrile and ethacrylonitrile; and the like. Among these, acrylonitrile and methacrylonitrile are preferable, and acrylonitrile is particularly preferable. These α,β-ethylenically unsaturated nitrile monomers may be used alone or in combination.

The amount of the α,β-ethylenically unsaturated nitrile monomer to be used in the monomer mixture used in the production method according to the present invention may be appropriately determined according to the composition of the final carboxyl group-containing nitrile rubber. The amount is preferably 5 to 90 wt %, more preferably 10 to 80 wt %, still more preferably 15 to 70 wt %. By controlling the amount of the α,β-ethylenically unsaturated nitrile monomer to be used within the range described above, the obtained carboxyl group-containing nitrile rubber can have excellent oil resistance and cold resistance.

The carboxyl group-containing monomer can be any monomer that is copolymerizable with the α,β-ethylenically unsaturated nitrile monomer and/or a diene monomer and has one or more unsubstituted (free) carboxyl groups not esterified or the like.

Examples of the carboxyl group-containing monomer include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxyl group-containing monomers also include those having carboxyl groups which form carboxylic acid salts. Moreover, anhydrides of the α,β-ethylenically unsaturated polyvalent carboxylic acids can be used as the carboxyl group-containing monomer because their acid anhydride groups can be cleaved to form carboxyl groups after copolymerization.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid; and itaconic acid, citraconic acid, mesaconic acid, glutaconic acid, allylmalonic acid, teraconic acid, and the like. Examples of the anhydrides of the α,β-ethylenically unsaturated polyvalent carboxylic acids include maleic anhydride, itaconic anhydride, citraconic anhydride, and the like.

Examples of the α,β-ethylenically unsaturated dicarboxylic acid monoester monomers include maleic acid monoalkyl esters such as monomethyl maleate, monoethyl maleate, monopropyl maleate, and mono-n-butyl maleate; maleic acid monocycloalkyl esters such as monocyclopentyl maleate, monocyclohexyl maleate, and monocycloheptyl maleic acid; maleic acid monoalkyl cycloalkyl esters such as monomethyl cyclopentyl maleate and monoethyl cyclohexyl maleate; fumaric acid monoalkyl esters such as monomethyl fumarate, monoethyl fumarate, monopropyl fumarate, and mono-n-butyl fumarate; fumaric acid monocycloalkyl esters such as monocyclopentyl fumarate, monocyclohexyl fumarate, and monocycloheptyl fumarate; fumaric acid monoalkyl cycloalkyl esters such as monomethyl cyclopentyl fumarate and monoethyl cyclohexyl fumarate; citraconic acid monoalkyl esters such as monomethyl citraconate, monoethyl citraconate, monopropyl citraconate, and mono-n-butyl citraconate; citraconic acid monocycloalkyl esters such as monocyclopentyl citraconate, monocyclohexyl citraconate, and monocycloheptyl citraconate; citraconic acid monoalkyl cycloalkyl esters such as monomethyl cyclopentyl citraconate and monoethyl cyclohexyl citraconate; itaconic acid monoalkyl esters such as monomethyl itaconate, monoethyl itaconate, monopropyl itaconate, and mono-n-butyl itaconate; itaconic acid monocycloalkyl esters such as monocyclopentyl itaconate, monocyclohexyl itaconate, and monocycloheptyl itaconate; itaconic acid monoalkyl cycloalkyl esters such as monomethyl cyclopentyl itaconate, and monoethyl cyclohexyl itaconate; and the like.

The carboxyl group-containing monomers may be used alone or in combination. For example, if the carboxyl group-containing nitrile rubber obtained through the production method according to the present invention is used in applications in which high adhesiveness is required, α,β-ethylenically unsaturated monocarboxylic acid monomers are preferable, acrylic acid and methacrylic acid are more preferable, and methacrylic acid is particularly preferable from the viewpoint of improving the adhesiveness. Alternatively, if the carboxyl group-containing nitrile rubber obtained through the production method according to the present invention is used in applications in which compression set resistance is required, from the viewpoint of reducing the compression set, the α,β-ethylenically unsaturated dicarboxylic acid monoester monomers are preferable, maleic acid monoalkyl esters are more preferable, and mono-n-butyl maleate is particularly preferable from the viewpoint of reducing the compression set.

The amount of the carboxyl group-containing monomer to be used in the monomer mixture used in the production method according to the present invention may be appropriately determined according to the composition of the final carboxyl group-containing nitrile rubber. The amount is preferably 0.1 to 20 wt %, more preferably 0.5 to 15 wt %, still more preferably 1.0 to 10 wt %. By controlling the amount of the carboxyl group-containing monomer to be used within the range described above, the effect of the introduced carboxyl group, such as high adhesiveness and excellent compression set resistance, can be properly improved.

Further, the monomer mixture used in the production method according to the present invention preferably contains a diene monomer in addition to the α,β-ethylenically unsaturated nitrile monomer and the carboxyl group-containing monomer described above.

Any diene monomer can be used without limitation. Examples thereof include conjugated dienes having 4 or more carbon atoms such as 1,3-butadiene, isoprene, 2,3-dimethyl-1,3-butadiene, and 1,3-pentadiene; and non-conjugated dienes having 5 to 12 carbon atoms such as 1,4-pentadiene and 1,4-hexadiene, and the like. Among these, the conjugated dienes are preferable, and 1,3-butadiene is more preferable.

The amount of the diene monomer to be used in the monomer mixture used in the production method according to the present invention may be appropriately determined according to the composition of the final carboxyl group-containing nitrile rubber. The amount is preferably 10 to 95 wt %, more preferably 20 to 90 wt %, and still more preferably 30 to 85 wt %. By controlling the amount of the diene monomer to be used within the range described above, the obtained carboxyl group-containing nitrile rubber can have excellent rubber elasticity while retaining good heat resistance and chemical stability.

Further, in addition to the α,β-ethylenically unsaturated nitrile monomer, the carboxyl group-containing monomer, and the diene monomer used if necessary, the monomer mixture used in the production method according to the present invention may contain additional monomers copolymerizable with these monomers. Any additional monomer can be used without limitation. Examples thereof include α,β-ethylenically unsaturated monocarboxylic acid ester monomers, α,β-ethylenically unsaturated dicarboxylic acid diester monomers, aromatic vinyl monomers, cross-linkable monomers, copolymerizable antioxidants, and the like.

Examples of the α,β-ethylenically unsaturated monocarboxylic acid ester monomers include (meth)acrylic acid esters (abbreviations for "methacrylic acid esters and acrylic acid esters," and the same applies hereinafter) having $C_1$ to $C_{18}$ alkyl groups such as methyl acrylate, ethyl acrylate, n-butyl acrylate, isobutyl acrylate, n-dodecyl acrylate, methyl methacrylate, and ethyl methacrylate; (meth)acrylic acid esters having $C_2$ to $C_{12}$ alkoxyalkyl groups such as methoxymethyl acrylate, 2-methoxyethyl acrylate, 2-methoxyethyl methacrylate, β-methoxypropyl acrylate, 4-ethoxybutyl methacrylate, 6-methoxyhexyl acrylate, 4-ethoxyheptyl methacrylate, and 8-methoxyoctyl acrylate; (meth)acrylic acid esters having $C_2$ to $C_{12}$ cyanoalkyl groups α-cyanoethyl acrylate, α-cyanoethyl methacrylate, and cyanobutyl methacrylate; (meth)acrylic acid esters having $C_1$ to $C_{12}$ hydroxyalkyl groups such as 2-hydroxyethyl acrylate, 2-hydroxypropyl acrylate, and 2-hydroxyethyl methacrylate; (meth)acrylic acid esters having $C_1$ to $C_{12}$ fluoroalkyl groups such as trifluoroethyl acrylate and tetrafluoropropyl methacrylate; and the like.

Examples of the α,β-ethylenically unsaturated dicarboxylic acid diester monomers include maleic diesters such as diethyl maleate; fumaric diesters such as dimethyl fumarate; citraconic acid diesters such as dimethyl citraconate; itaconic acid diesters such as dibutyl itaconate; and the like.

Examples of the aromatic vinyl monomers include styrene, α-methylstyrene, vinylpyridine, and the like.

Examples of the cross-linkable monomers include polyfunctional ethylenically unsaturated monomers such as divinyl compounds such as divinylbenzene; di(meth)acrylic acid esters such as ethylene di(meth)acrylate, diethylene glycol di(meth)acrylate, and ethylene glycol di(meth)acrylate; and trimethacrylic acid esters such as trimethylolpropane tri(meth)acrylate; self-cross-linkable monomers such as N-methylol(meth)acrylamide and N,N'-dimethylol(meth)acrylamide, and the like.

Examples of the copolymerizable antioxidants include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

These additional copolymerizable monomers may be used in combination. The amount of the additional copolymerizable monomers to be used in the monomer mixture used in the production method according to the present invention may be appropriately determined according to the composition of the final carboxyl group-containing nitrile rubber. The amount is preferably 50 wt % or less, more preferably 30 wt % or less, still more preferably 10 wt % or less.

In the polymerization step in the production method according to the present invention, a nitrile rubber dispersion is obtained by polymerizing the monomer mixture described above in a solvent. Although any polymerization method can be used without limitation, emulsion polymerization is preferable from the viewpoint of the industrial productivity. In emulsion polymerization, polymerization additives usually used can be used in addition to an emulsifier, a polymerization initiator, and a molecular weight adjuster.

Any emulsifier can be used without limitation. Examples thereof include nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linoleic acid, alkylbenzene sulfonic acid salts such as sodium dodecylbenzene sulfonate, higher alcohol sulfuric acid ester salts, and alkyl sulfosuccinic acid salts; copolymerizable emulsifiers such as sulfo esters of α,β-unsaturated carboxylic acids, sulfate esters of α,β-unsaturated carboxylic acids, sulfoalkylaryl ethers; and the like. The amount of the emulsifier to be added is preferably 0.1 to 10 parts by weight, more preferably 0.5 to 5 parts by weight relative to 100 parts by weight of the monomer mixture used in the polymerization.

Any radical polymerization initiator can be used as the polymerization initiator without limitation. Examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butylperoxyisobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination. Preferred polymerization initiators are inorganic or organic peroxides. If a peroxide is used as the polymerization initiator, a combination thereof with a reducing agent such as sodium bisulfite, ferrous sulfate, sodium formaldehydesulfoxylate, or sodium iron ethylenediaminetetraacetate can be used as a redox polymerization initiator. The amount of the polymerization initiator to be added is preferably 0.01 to 2 parts by weight relative to 100 parts by weight of the monomer mixture used in the polymerization.

Any molecular weight adjuster can be used without limitation. Examples thereof include mercaptans such as t-dodecyl mercaptan, n-dodecyl mercaptan, and octyl mercaptan; halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropyl xanthogen disulfide; and the like. These may be used alone or in combination. Among these, mercaptans are preferable, and t-dodecyl mercaptan is more preferable. The amount of the molecular weight adjuster to be used is preferably 0.1 to 0.8 parts by weight relative to 100 parts by weight of all the monomers.

For the medium (solvent) of emulsion polymerization, usually water is used. The amount of water is preferably 80 to 500 parts by weight, more preferably 80 to 300 parts by weight relative to 100 parts by weight of the monomers used in the polymerization.

In the emulsion polymerization, polymerization additives such as a stabilizer, a dispersant, a pH adjuster, a deoxidizer, and a particle size adjuster can be further used if necessary. If used, polymerization additives of any types can be used in any amounts.

<Polymerization Termination Step>

In the polymerization termination step in the production method according to the present invention, after the polymerization reaction of the monomer mixture in the polymerization step described above is initiated, when a predetermined polymerization conversion ratio is achieved, a nitrous acid salt and a water-insoluble hydroquinone as polymerization terminators are added to the polymerization system to terminate the polymerization reaction. A dispersion of the carboxyl group-containing nitrile rubber having a pH of 7 or below is thus obtained.

Further, in the polymerization termination step in the production method according to the present invention, the amount of the nitrous acid salt to be used is 0.15 parts by weight or less relative to 100 parts by weight of the monomer mixture used in the polymerization reaction.

The present inventors, who have conducted extensive research to reduce the discoloration of the carboxyl group-containing nitrile rubber, have found that a polymerization terminator used in the polymerization reaction is responsible for the discoloration of the carboxyl group-containing nitrile rubber. Such findings have led to a discovery that the consideration of the polymerization terminators is effective in significantly reducing the discoloration of the carboxyl group-containing nitrile rubber.

On the other hand, the monomer mixture used in the polymerization reaction of the carboxyl group-containing nitrile rubber contains a carboxyl group-containing monomer, which results in an acidic polymerization system (i.e. pH=7 or below). A polymerization terminator which can demonstrate a sufficient polymerization termination effect under such an acidic condition needs to be selected.

The present inventors have conducted further research under such conditions, and have found that while a sufficient polymerization termination effect can be achieved even under the acidic condition by using a nitrous acid salt as a polymerization terminator, the discoloration of the carboxyl group-containing nitrile rubber cannot be prevented if the nitrous acid salt is used alone in an amount large enough to provide a sufficient polymerization termination effect. In contrast, they also have found that by using a water-soluble hydroquinone in combination to reduce the amount of the nitrous acid salt to be used to a specific amount or less, the discoloration of the obtained carboxyl group-containing nitrile rubber can be significantly reduced while the sufficient polymerization termination effect can be provided.

The present inventors have completed the present invention based on such findings. The production method according to the present invention can provide the sufficient polymerization termination effect, and thus can provide a carboxyl group-containing nitrile rubber having excellent stability (stable properties) and having reduced discoloration.

Any nitrous acid salt can be used without limitation. Examples thereof include calcium nitrite, potassium nitrite, sodium nitrite, barium nitrite, and the like. Among these, potassium nitrite and sodium nitrite are preferable, and sodium nitrite is more preferable from the viewpoint of the high polymerization termination effect and the high discoloration reducing effect.

The amount of the nitrous acid salt to be used is 0.15 parts by weight or less, preferably 0.01 to 0.15 parts by weight, more preferably 0.02 to 0.13 parts by weight, still more preferably 0.05 to 0.10 parts by weight, relative to 100 parts by weight of the monomer mixture used in the polymerization reaction. If the amount of the nitrous acid salt to be used is too large, the obtained carboxyl group-containing nitrile rubber may be discolored. Meanwhile, if the nitrous acid salt is not used, the sufficient polymerization termination effect cannot be achieved, leading to a further progression of the polymerization reaction even after the polymerization terminator is added. As a result, the obtained carboxyl group-containing nitrile rubber will have low stability (unstable properties). That is, the carboxyl group-containing nitrile rubber having desired properties is difficult to produce. As a result, the obtained carboxyl group-containing nitrile rubber will have unstable properties.

Any water-insoluble hydroquinone can be used without limitation. Examples thereof include t-butylhydroquinone, 2,5-di-t-butylhydroquinone, 2,5-di-t-amylhydroquinone, tetrachlorohydroquinone, methylcarboaminohydroquinone, methylureidehydroquinone, methylthiohydroquinone, and the like. Among these, 2,5-di-t-amylhydroquinone is preferable from the viewpoint of the high polymerization termination effect and the high discoloration reducing effect. Note that the water-insoluble hydroquinone indicates hydroquinones substantially insoluble in water, and may be those having a solubility of about 1 wt % or less, for example.

The water-insoluble hydroquinone can be used in any amount. The amount is preferably 0.1 to 1.0 part by weight, more preferably 0.1 to 0.7 parts by weight, still more preferably 0.1 to 0.5 parts by weight relative to 100 parts by weight of the monomer mixture. By controlling the amount of the water-insoluble hydroquinone to be used within the range described above, the discoloration of the carboxyl group-containing nitrile rubber can be more effectively reduced while the sufficient polymerization termination effect is provided.

In addition, the weight ratio of the amount of the nitrous acid salt to be used as the polymerization terminator to the amount of the water-insoluble hydroquinone to be used as the polymerization terminator is not particularly limited. The weight ratio is within the range of preferably 1:0.5 to 1:100, more preferably 1:0.8 to 1:35, still more preferably 1:1 to 1:10 from the viewpoint of improving the polymerization termination effect and the discoloration reducing effect.

In the polymerization termination step in the production method according to the present invention, the polymerization reaction of the monomer mixture in the polymerization step described above is initiated. When a predetermined polymerization conversion ratio is achieved, the nitrous acid salt and the water-insoluble hydroquinone as the polymerization terminators are added to the polymerization system to terminate the polymerization reaction. The addition of the nitrous acid salt and the water-insoluble hydroquinone to the polymerization system to terminate the polymerization can be performed at any timing, and the timing may be appropriately selected according to the composition of the carboxyl group-containing nitrile rubber to be obtained. The timing is preferably when the polymerization conversion ratio reaches 50% or more, more preferably when the polymerization conversion ratio reaches 60% or more, still more preferably when the polymerization conversion ratio reaches 65% or more, particularly preferably when the polymerization conversion ratio reaches 70% or more.

Further, the nitrous acid salt and the water-insoluble hydroquinone can be added to the polymerization system by any method. The nitrous acid salt and the water-insoluble hydroquinone may be added separately, or the nitrous acid salt and the water-insoluble hydroquinone may be added simultaneously. Moreover, if the nitrous acid salt and the water-insoluble hydroquinone are added separately, the addition can be performed in any order. The nitrous acid salt may be added first, and then the water-insoluble hydroquinone may be added, or vice versa. Note that the nitrous acid salt may be added without dissolved or dispersed in a solvent or the like, or the nitrous acid salt may be added in the state where it is dissolved or dispersed in a solvent. Suitably, the nitrous acid salt is added in the form of an aqueous solution of the nitrous acid salt dissolved in water, for example. In addition, the water-insoluble hydroquinone may also be added without dissolved or dispersed in a solvent or the like, or the water-insoluble hydroquinone may be added in the state where it is dissolved or dispersed in a solvent. Preferably, the water-insoluble hydroquinone is added in the form of an aqueous solution of the water-insoluble hydroquinone dispersed in water because it can be effectively dispersed in the polymerization system and thus the more sufficient polymerization termination effect can be provided. Further, if the nitrous acid salt and the water-insoluble hydroquinone are added to the polymerization system simultaneously, a mixture thereof may be added. Alternatively, the nitrous acid salt and the water-insoluble hydroquinone may be added in the state where they are dispersed or dissolved in a solvent such as water.

In the polymerization termination step in the production method according to the present invention, the polymerization reaction is terminated by using the nitrous acid salt and the water-insoluble hydroquinone described above as the polymerization terminators, thereby obtaining a dispersion of the carboxyl group-containing nitrile rubber having a pH of 7 or below. In particular, according to the production method according to the present invention, the nitrous acid salt and the water-insoluble hydroquinone described above are used in combination as the polymerization terminators, and the amount of the nitrous acid salt to be used is controlled within the range described above, so that the polymerization reaction can be properly terminated even under an acidic condition at a pH of 7 or below. This can properly prevent a failure, i.e., low stability (unstable properties) of the obtained carboxyl group-containing nitrile rubber caused as a result of undesirable progression of the polymerization reaction even after the polymerization terminator(s) is(are) added. As a result, the obtained carboxyl group-containing nitrile rubber can have excellent stability (stable properties), and the discoloration in the subsequent drying operation can also be significantly reduced.

Note that in the polymerization termination step in the production method according to the present invention, the polymerization reaction can be properly terminated even under the acidic condition at a pH of 7 or below, thereby obtaining a dispersion of the carboxyl group-containing nitrile rubber having a pH of 7 or below. The pH of the dispersion of the carboxyl group-containing nitrile rubber is preferably 6.5 or less, more preferably 6.0 or less. Although the pH of the dispersion of the carboxyl group-containing nitrile rubber can have any lower limit, the lower limit is usually 1.0 or more. Note that the pH of the polymerization system and the pH of the dispersion of the carboxyl group-containing nitrile rubber may be adjusted by adding a pH adjuster.

<Coagulation Step>

In the coagulating step in the production method according to the present invention, the dispersion of the carboxyl group-containing nitrile rubber which is obtained above and has a pH of 7 or below is coagulated, thereby obtaining the carboxyl group-containing nitrile rubber in the solid state.

The coagulation step in the production method according to the present invention can be performed using any coagulation method. Examples thereof include coagulation by salting-out using a known coagulant such as sodium chloride, calcium chloride, or aluminum sulfate, and the like. Alternatively, instead of the coagulation by salting out, the coagulation may be performed by using an alcohol such as methanol.

The coagulation step in the production method according to the present invention can be performed at any coagulating temperature. The coagulating temperature is preferably 10 to 90° C., more preferably 20 to 80° C.

Further, in the production method according to the present invention, it is preferable that the solid carboxyl group-containing nitrile rubber obtained through the coagulation be dried in order to remove the solvent and the like. The drying temperature is preferably 60 to 250° C., more preferably 70 to 200° C. Further, the drying time is preferably 10 to 120 minutes, more preferably 20 to 100 minutes. According to the production method according to the present invention, the discoloration caused by such a drying operation can be significantly reduced because the nitrous acid salt and the water-insoluble hydroquinone described above are used in combination as the polymerization terminators to terminate the polymerization reaction and the amount of the nitrous acid salt to be used is controlled within the range described above.

Further, in the production method according to the present invention, the obtained carboxyl group-containing nitrile rubber may be subjected to a hydrogenation reaction in which at least some of the carbon-carbon double bonds contained in the carboxyl group-containing nitrile rubber are hydrogenated and converted to carbon-carbon saturated bonds. The hydrogenation reaction may be performed on the dispersion of the carboxyl group-containing nitrile rubber before coagulation. Alternatively, the solid carboxyl group-containing nitrile rubber obtained through the coagulation may be dispersed or dissolved in a solvent, and then the hydrogenation reaction may be performed on the dispersion or solution of the carboxyl group-containing nitrile rubber. The hydrogenation reaction in this case can be performed by any known method without limitation.

The production method according to the present invention described above can properly prevent a failure, i.e., low stability of the obtained carboxyl group-containing nitrile rubber caused as a result of undesirable progression of the polymerization reaction even after the polymerization terminator is added. This can provide the carboxyl group-containing nitrile rubber which has excellent stability (stable properties) and whose discoloration is significantly reduced. Utilizing such properties, the carboxyl group-containing nitrile rubber obtained through the production method according to the present invention can be used in a wide range of fields such as industrial belts, hoses, seals, packings, gaskets, and the like and applications of adhesives. In particular, since the discoloration of the carboxyl group-containing nitrile rubber is significantly reduced, the carboxyl group-containing nitrile rubber can be particularly suitably used in applications in which the discoloration should be prevented.

For example, as an example of the applications in which the discoloration should be prevented, such as applications to adhesives, the carboxyl group-containing nitrile rubber obtained through the production method according to the present invention can be suitably used as an adhesive applied to adherends, the adhesive being prepared by adding compounding agents usually used in the field of rubber processing such as a crosslinker and a cross-linking accelerator as needed to the carboxyl group-containing nitrile rubber, and dissolving the mixture in an organic solvent which can dissolve the carboxyl group-containing nitrile rubber.

Alternatively, as an another example of the applications in which the discoloration should be prevented, i.e., applications to industrial belts, packings, and the like, the carboxyl group-containing nitrile rubber obtained through the production method according to the present invention can be used as a cross-linked rubber of a desired shape prepared by adding a crosslinker, a cross-linking accelerator, a colorant, and compounding agents usually used in the field of rubber processing to the carboxyl group-containing nitrile rubber to prepare a rubber composition, and cross-linking the rubber composition.

EXAMPLES

Hereinafter, the present invention will be described specifically by way of Examples and Comparative Examples. In each example, the term "parts" is based on weight unless otherwise specified. Note that the tests and the evaluations were carried out as follows.

<Polymerization Termination Effect of Polymerization Terminators>

Using the polymer latex obtained by emulsion polymerization followed by addition of the polymerization terminators, the polymerization termination effect of the polymerization terminators was evaluated by the following method.

Specifically, the latex of the carboxyl group-containing nitrile rubber obtained using the polymerization terminators was divided into three portions, which were referred to as a first polymer latex, a second polymer latex, and a third polymer latex, respectively. The following measurements were then performed.

Specifically, first, using the first polymer latex, the polymerization conversion ratio was measured, and was defined as a polymerization conversion ratio (%) before storage (Conv$_{-ini}$). Next, the first polymer latex was coagulated using sodium chloride as a coagulant, and was dried at 90° C. for 1.5 hours. A solid carboxyl group-containing nitrile rubber was thus obtained. The Mooney viscosity of the obtained solid carboxyl group-containing nitrile rubber was measured according to JIS K 6300 (the unit: [ML1+4, 100° C.]), and was defined as a Mooney viscosity before storage (ML$_{-ini}$).

Apart from the above latex, the second polymer latex was stored under an environment at 5° C. for 5 hours, and then the polymer latex stored at 5° C. was obtained. The polymerization conversion ratio of the obtained polymer latex stored at 5° C. was measured in the same manner as above, and was defined as a polymerization conversion ratio (%) after storage at 5° C. (Conv$_{-5° C.}$). Next, the polymer latex stored at 5° C. was coagulated and dried in the same manner as above. A solid carboxyl group-containing nitrile rubber was thus obtained. The Mooney viscosity of the obtained solid carboxyl group-containing nitrile rubber was measured in the same manner as above, and was defined as a Mooney viscosity after storage at 5° C. (ML$_{-5° C.}$).

Apart from the above latices, the third polymer latex was stored under an environment at 50° C. for 5 hours, and then the polymer latex stored at 50° C. was obtained. The polymerization conversion ratio of the obtained polymer latex stored at 50° C. was measured in the same manner as above, and was defined as a polymerization conversion ratio (%) after storage at 50° C. (Conv$_{-50° C.}$). Next, the polymer latex stored at 50° C. was coagulated and dried in the same manner as above. A solid carboxyl group-containing nitrile rubber was thus obtained. The Mooney viscosity of the obtained solid carboxyl group-containing nitrile rubber was measured in the same manner as above, and was defined as a Mooney viscosity after storage at 50° C. (ML$_{-50° C.}$).

From the results of the measurements above, the increase in polymerization conversion ratio after storage at 5° C. (ΔConv$_{-5° C.}$), the increase in polymerization conversion ratio after storage at 50° C. (ΔConv$_{-50° C.}$), the increase in Mooney viscosity after storage at 5° C. (ΔML$_{-5° C.}$), and the increase in Mooney viscosity after storage at 50° C. (ΔME$_{-50° C.}$) were calculated according to the following expressions to evaluate the polymerization termination effect of the polymerization terminators:

Increase in polymerization conversion ratio after storage at 5° C. (ΔConv$_{-5° C.}$)=(Polymerization conversion ratio (%) after storage at 5° C. (Conv$_{-5° C.}$))−(Polymerization conversion ratio (%) before storage (Conv$_{-ini}$))

Increase in polymerization conversion ratio (%) after storage at 50° C. (ΔConv$_{-50° C.}$)=(Polymerization conversion ratio (%) after storage at 50° C. (Conv$_{-50° C.}$))−(Polymerization conversion ratio (%) before storage (Conv$_{-ini}$))

Increase in Mooney viscosity after storage at 5° C. (ΔML$_{-5° C.}$)=(Mooney viscosity after storage at 5° C. (ML$_{-5° C.}$))−(Mooney viscosity before storage (ML$_{-ini}$)).

Increase in Mooney viscosity after storage at 50° C. (ΔML$_{-50° C.}$)=(Mooney viscosity after storage at 50° C. (ML$_{-50° C.}$))−(Mooney viscosity before storage (ML$_{-ini}$)).

<Discoloration of Carboxyl Group-Containing Nitrile Rubber>

The discoloration of the solid carboxyl group-containing nitrile rubber obtained by coagulating and drying the first polymer latex was visually evaluated according to the following criteria.

A: No discoloration is observed compared to the nitrile rubber prepared in Comparative Example 1.

B: Discoloration is observed as much as that of the nitrile rubber prepared in Comparative Example 1.

F: Discoloration is remarkably observed compared to the nitrile rubber produced in Comparative Example 1.

<Scorch Stability of Carboxyl Group-Containing Nitrile Rubber>

1.5 parts of sulfur as a crosslinker, 2 parts of di(benzothiazol-2-yl) disulfide (trade name "Nocceler DM" made by Ouchi Shinko Chemical Industrial Co., Ltd., vulcanization accelerator), 40 parts of SRF carbon (trade name "Seast S" made by Tokai Carbon Co., Ltd., carbon black), 5 parts of zinc peroxide, and 1 part of stearic acid were compounded with 100 parts of the solid carboxyl group-containing nitrile rubber, which was obtained by coagulating and drying the first polymer latex, to prepare a rubber composition. The Mooney scorch time (t5) of the obtained rubber composition

Example 1

68 parts of 1,3-butadiene, 25 parts of acrylonitrile, 7 parts of methacrylic acid, 0.5 parts of t-dodecyl mercaptan as a chain transfer agent, 200 parts of deionized water, 2.0 parts of sodium dodecylbenzenesulfonate, 1.0 part of a sodium β-naphthalenesulfonate formalin condensate, 0.15 parts of cumene hydroperoxide, and suitable amounts of iron, a reducing agent and a chelating agent were placed into a pressure polymerization reactor with a stirrer, and then the polymerization was initiated while the polymerization temperature was held at 5° C. When the polymerization conversion ratio reached 65%, 0.025 parts of sodium nitrite as a polymerization terminator, 1.6 parts of a 25 wt % aqueous dispersion of 2,5-di-t-amylhydroquinone (trade name "ANTAGE DAH," made by Kawaguchi Chemical Industry Co., LTD.) (0.4 parts in terms of 2,5-di-t-amylhydroquinone) as a polymerization terminator were added to terminate the polymerization reaction. A latex of a carboxyl group-containing nitrile rubber having a pH of 4.2 was thus obtained. The composition of the obtained carboxyl group-containing nitrile rubber was 68 wt % of the 1,3-butadiene unit, 25 wt % of the acrylonitrile unit, and 7 wt % of the methacrylic acid unit (Examples 1 to 5 and Comparative Examples 1 to 7 described later also had the same composition).

Using the obtained latex of the carboxyl group-containing nitrile rubber, the polymerization termination effect of the polymerization terminators, and the discoloration and scorch stability of the carboxyl group-containing nitrile rubber were evaluated according to the method described above. The results are shown in Table 1.

Example 2

A latex of a carboxyl group-containing nitrile rubber having a pH of 3.8 was obtained in the same manner as in Example 1 except that the amount of the sodium nitrite used as the polymerization terminator was 0.05 parts. The obtained latex of the carboxyl group-containing nitrile rubber was evaluated in the same manner as in Example 1. The results are shown in Table 1.

Example 3

A latex of a carboxyl group-containing nitrile rubber having a pH of 5.5 was obtained in the same manner as in Example 2 except that the amount of the 25 wt % aqueous dispersion of 2,5-di-t-amylhydroquinone used as the polymerization terminator was 0.8 parts (0.2 parts in terms of 2,5-di-t-amylhydroquinone). The obtained latex of the carboxyl group-containing nitrile rubber was evaluated in the same manner as in Example 1. The results are shown in Table 1.

Example 4

A latex of a carboxyl group-containing nitrile rubber having a pH of 4.5 was obtained in the same manner as in Example 1 except that the amount of the sodium nitrite used as the polymerization terminator was 0.15 parts. The obtained latex of the carboxyl group-containing nitrile rubber was evaluated in the same manner as in Example 1. The results are shown in Table 1.

Example 5

A latex of a carboxyl group-containing nitrile rubber having a pH of 5.3 was obtained in the same manner as in Example 1 except that the amount of the sodium nitrite used as the polymerization terminator was 0.1 parts and the amount of the 25 wt % aqueous dispersion of 2,5-di-t-amylhydroquinone used as the polymerization terminator was 0.4 parts (0.1 parts in terms of 2,5-di-t-amylhydroquinone). The obtained latex of the carboxyl group-containing nitrile rubber was evaluated in the same manner as in Example 1. The results are shown in Table 1.

Example 6

68 parts of 1,3-butadiene, 25 parts of acrylonitrile, 7 parts of methacrylic acid, 0.5 parts of t-dodecyl mercaptan as a chain transfer agent, 200 parts of deionized water, 2.0 parts of sodium dodecylbenzenesulfonate, 1.0 part of a sodium β-naphthalenesulfonate formalin condensate, 0.15 parts of cumene hydroperoxide, and suitable amounts of iron, a reducing agent and a chelating agent were placed into a pressure polymerization reactor with a stirrer, and then the polymerization was initiated while the polymerization temperature was held at 5° C. When the polymerization conversion ratio reached 80%, 0.05 parts of sodium nitrite as the polymerization terminator, 0.8 parts of a 25 wt % aqueous dispersion of 2,5-di-t-amylhydroquinone (trade name "ANTAGE DAH," made by Kawaguchi Chemical Industry Co., LTD.) (0.2 parts in terms of 2,5-di-t-amylhydroquinone) as the polymerization terminator were added to terminate the polymerization reaction. A latex of a carboxyl group-containing nitrile rubber having a pH of 5.5 was thus obtained. The composition of the obtained carboxyl group-containing nitrile rubber was 68 wt % of the 1,3-butadiene unit, 25 wt % of the acrylonitrile unit, and 7 wt % of the methacrylic acid unit. The obtained latex of the carboxyl group-containing nitrile rubber was evaluated in the same manner as in Example 1. The results are shown in Table 1.

Comparative Example 1

A latex of a carboxyl group-containing nitrile rubber having a pH of 3.9 was obtained in the same manner as in Example 1 except that 0.2 parts of hydroxylamine sulfate was used as the polymerization terminator in place of sodium nitrite and 2,5-di-t-amylhydroquinone. The obtained latex of the carboxyl group-containing nitrile rubber was evaluated in the same manner as in Example 1. The results are shown in Table 1.

Comparative Example 2

A latex of a carboxyl group-containing nitrile rubber having a pH of 3.8 was obtained in the same manner as in Example 1 except that 0.2 parts of diethylhydroxyamine was used as the polymerization terminator in place of sodium nitrite and 2,5-di-t-amylhydroquinone. The obtained latex of the carboxyl group-containing nitrile rubber was evaluated in the same manner as in Example 1. The results are shown in Table 1.

Comparative Example 3

A latex of a carboxyl group-containing nitrile rubber having a pH of 4.4 was obtained in the same manner as in Example 1 except that 0.2 parts of methylhydroquinone (water-soluble hydroquinone) was used as the polymerization terminator in place of sodium nitrite and 2,5-di-t-amylhydroquinone. The obtained latex of the carboxyl group-containing nitrile rubber was evaluated in the same manner as in Example 1. The results are shown in Table 1.

Comparative Example 4

A latex of a carboxyl group-containing nitrile rubber having a pH of 4.2 was obtained in the same manner as in Example 1 except that 2,5-di-t-amylhydroquinone was not used as the polymerization terminator. The obtained latex of the carboxyl group-containing nitrile rubber was evaluated in the same manner as in Example 1. The results are shown in Table 1.

Comparative Example 5

A latex of a carboxyl group-containing nitrile rubber having a pH of 5.6 was obtained in the same manner as in Comparative Example 4 except that the amount of the sodium nitrite used as the polymerization terminator was 0.05 parts. The obtained latex of the carboxyl group-containing nitrile rubber was evaluated in the same manner as in Example 1. The results are shown in Table 1.

Comparative Example 6

A latex of a carboxyl group-containing nitrile rubber having a pH of 4.5 was obtained in the same manner as in Comparative Example 4 except that the amount of the sodium nitrite used as the polymerization terminator was 0.2 parts. The obtained latex of the carboxyl group-containing nitrile rubber was evaluated in the same manner as in Example 1. The results are shown in Table 1.

Comparative Example 7

A latex of a carboxyl group-containing nitrile rubber having a pH of 4.1 was obtained in the same manner as in Example 1 except that the amount of the sodium nitrite used as the polymerization terminator was 0.2 parts and the amount of the 25 wt % aqueous dispersion of 2,5-di-t-amylhydroquinone used as the polymerization terminator was 0.8 parts (0.2 parts in terms of 2,5-di-t-amylhydroquinone). The obtained latex of the carboxyl group-containing nitrile rubber was evaluated in the same manner as in Example 1. The results are shown in Table 1.

TABLE 1

| | | | | Example | | | | | | Comparative Example |
|---|---|---|---|---|---|---|---|---|---|---|
| | | | | 1 | 2 | 3 | 4 | 5 | 6 | 1 |
| Polymerization Condition | Monomers | Acrylonitrile | (parts) | 25 | 25 | 25 | 25 | 25 | 25 | 25 |
| | | 1,3-Butadiene | (parts) | 68 | 68 | 68 | 68 | 68 | 68 | 68 |
| | | Methacrylic acid | (parts) | 7 | 7 | 7 | 7 | 7 | 7 | 7 |
| | Polymerization Terminators | Sodium nitrite | (parts) | 0.025 | 0.05 | 0.05 | 0.15 | 0.1 | 0.05 | — |
| | | 2,5-Di-t-amythydroquinone | (parts) | 0.4 | 0.4 | 0.2 | 0.4 | 0.1 | 0.2 | — |
| | | Hydroxylamine sulfate | (parts) | — | — | — | — | — | — | 0.2 |
| | | Diethythydroxyamine | (parts) | — | — | — | — | — | — | — |
| | | Methythydroquinone | (parts) | — | — | — | — | — | — | — |
| pH of latex of carboxyl group-containing nitrile rubber | | | | 4.2 | 3.8 | 5.5 | 4.5 | 5.3 | 5.5 | 3.9 |
| Polymerization termination effect | | Polymerization conversion ratio after addition of polymerization terminator | (%) | 65 | 65 | 65 | 65 | 65 | 80 | 65 |
| | | Increase in polymerization conversion ratio after storage at 5° C. (Δconv_5° C.) | (%) | 0.4 | 0.2 | 0.3 | −0.2 | 0.7 | 0.1 | 8.6 |
| | | Increase in polymerization conversion ratio after storage at 50° C. (Δconv_50° C.) | (%) | 0.8 | 0.1 | 0.9 | 0.5 | 0.2 | 0.0 | 20.2 |
| | | Increase in Mooney viscosity after storage at 5° C. (ΔML_5° C.) | | 0.4 | 0.2 | 0.5 | 0.1 | 1.1 | 0.2 | 9.0 |
| | | Increase in Mooney viscosity after storage at 50° C. (ΔML_50° C.) | | 0.5 | 0.2 | 0.1 | 0.4 | 1 | 0.5 | 30 |
| Discoloration of latex carboxyl group-containing nitrile rubber | | | | A | A | A | A | A | A | B |
| Scorch stability of carboxyl group-containing nitrile rubber (scorch time, t5) | | | (min) | 9.1 | 9.3 | 10.3 | 9.2 | 10.4 | 9.4 | 10.5 |

| | | | | Comparative Example | | | | | |
|---|---|---|---|---|---|---|---|---|---|
| | | | | 2 | 3 | 4 | 5 | 6 | 7 |
| Polymerization Condition | Monomers | Acrylonitrile | (parts) | 25 | 25 | 25 | 25 | 25 | 25 |
| | | 1,3-Butadiene | (parts) | 68 | 68 | 68 | 68 | 68 | 68 |
| | | Methacrylic acid | (parts) | 7 | 7 | 7 | 7 | 7 | 7 |
| | Polymerization Terminators | Sodium nitrite | (parts) | — | — | 0.025 | 0.05 | 0.2 | 0.2 |
| | | 2,5-Di-t-amylhydroquinone | (parts) | — | — | — | — | — | 0.2 |
| | | Hydroxylamine sulfate | (parts) | — | — | — | — | — | — |
| | | Diethylhydroxyamine | (parts) | 0.2 | — | — | — | — | — |
| | | Methylhydroquinone | (parts) | — | 0.2 | — | — | — | — |

TABLE 1-continued

|  |  |  |  |  |  |  |  |  |
|---|---|---|---|---|---|---|---|---|
| pH of latex of carboxyl group-containing nitrile rubber |  |  | 3.8 | 4.4 | 4.2 | 5.6 | 4.5 | 4.1 |
| Polymerization termination effect | Polymerization conversion ratio after addition of polymerization terminator | (%) | 65 | 65 | 65 | 65 | 65 | 85 |
|  | Increase in polymerization conversion ratio after storage at 5° C. ($\Delta$conv_5° C.) | (%) | 1.3 | 16.7 | 3.5 | 1.2 | −0.1 | 0.1 |
|  | Increase in polymerization conversion ratio after storage at 50° C. ($\Delta$conv_50° C.) | (%) | 31.3 | 32.5 | 17.7 | 10.4 | 0.4 | 0.0 |
|  | Increase in Mooney viscosity after storage at 5° C. ($\Delta$ML_5° C.) |  | 1.0 | 17.0 | 8.0 | 1.3 | 0.1 | 0.7 |
|  | Increase in Mooney viscosity after storage at 50° C. ($\Delta$ML_50° C.) |  | 21 | 43 | 18 | 8 | 0.5 | 1 |
| Discoloration of latex carboxyl group-containing nitrile rubber |  |  | A | A | A | A | F | F |
| Scorch stability of carboxyl group-containing nitrile rubber (scorch time, t5) |  | (min) | 10.8 | 10.1 | 10.9 | 11 | 10.1 | 10.7 |

Table 1 shows that if the nitrous acid salt and the water-insoluble hydroquinone were used in combination and the amount of the nitrous acid salt used was 0.15 parts by weight or less relative to 100 parts by weight of the monomer mixture used in the polymerization reaction, the values of the increase in polymerization conversion ratio after storage at 5° C. ($\Delta$Conv$_{-5° C.}$), the increase in polymerization conversion ratio after storage at 50° C. ($\Delta$Conv$_{-5° C.}$), the increase in Mooney viscosity after storage at 5° C. ($\Delta$ML$_{-5° C.}$), and the increase in Mooney viscosity after storage at 50° C. ($\Delta$ML$_{-5° C.}$) were all low and a sufficient polymerization termination effect was obtained. Table 1 also shows that the discoloration of the obtained carboxyl group-containing nitrile rubbers was significantly reduced (Examples 1 to 6).

Meanwhile, if polymerization terminator(s) other than the nitrous acid salt and the water-insoluble hydroquinone was (were) used as the polymerization terminators, the values of the increase in polymerization conversion ratio after storage at 5° C. ($\Delta$Conv$_{-5° C.}$), the increase in polymerization conversion ratio after storage at 50° C. ($\Delta$Conv$_{-5° C.}$), the increase in Mooney viscosity after storage at 5° C. ($\Delta$ML$_{-5° C.}$), and the increase in Mooney viscosity after storage at 50° C. ($\Delta$ML$_{-50° C.}$) were all high and a sufficient polymerization termination effect was not obtained (Comparative Examples 1 to 3).

Further, if the nitrous acid salt was used alone and the amount thereof used was 0.15 parts by weight or less relative to 100 parts by weight of the monomer mixture used in the polymerization reaction, the polymerization termination effect was not sufficient. On the other hand, if the amount of the nitrous acid salt used was greater than 0.15 parts by weight, the obtained carboxyl group-containing nitrile rubber had undesired discoloration (Comparative Examples 4 to 6).

Further, if the nitrous acid salt and the water-insoluble hydroquinone were used in combination and the amount of the nitrous acid salt used was greater than 0.15 parts by weight relative to 100 parts by weight of the monomer mixture used in the polymerization reaction, the obtained carboxyl group-containing nitrile rubber had undesired discoloration (Comparative Example 7).

The invention claimed is:

1. A method for producing a carboxyl group-containing nitrile rubber, comprising the steps of:
   polymerizing a monomer mixture comprising an α,β-ethylenically unsaturated nitrile monomer and a carboxyl group-containing monomer in a solvent;
   terminating a polymerization reaction by adding a nitrous acid salt and a water-insoluble hydroquinone as polymerization terminators to the polymerization system when a predetermined polymerization conversion ratio is achieved, thereby obtaining a dispersion of the carboxyl group-containing nitrile rubber having a pH of 7 or below; and
   coagulating the dispersion of the carboxyl group-containing nitrile rubber, thereby obtaining the carboxyl group-containing nitrile rubber in the solid state,
   wherein the amount of the nitrous acid salt to be used is 0.15 parts by weight or less relative to 100 parts by weight of the monomer mixture used in the polymerization reaction.

2. The method for producing a carboxyl group-containing nitrile rubber according to claim 1, wherein the water-insoluble hydroquinone is added in the form of a dispersion in which the water-insoluble hydroquinone is dispersed in water.

3. The method for producing a carboxyl group-containing nitrile rubber according to claim 1, wherein the amount of the water-insoluble hydroquinone to be used is 0.1 to 1.0 part by weight relative to 100 parts by weight of the monomer mixture used in the polymerization reaction.

4. The method for producing a carboxyl group-containing nitrile rubber according to claim 1, wherein the weight ratio of the amount of the nitrous acid salt to be used to the amount of the water-insoluble hydroquinone to be used is within the range from 1:0.5 to 1:100.

\* \* \* \* \*